United States Patent
Hu et al.

(10) Patent No.: US 12,436,243 B2
(45) Date of Patent: Oct. 7, 2025

(54) DETECTION APPARATUS, LASER RADAR SYSTEM, AND TERMINAL

(71) Applicant: SHENZHEN YINWANG INTELLIGENT TECHNOLOGIES CO., LTD., Shenzhen (CN)

(72) Inventors: Xuan Hu, Shanghai (CN); Guangyao Yang, Shanghai (CN); Xianling Shi, Shanghai (CN); Zhizhen Huang, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 187 days.

(21) Appl. No.: 18/345,739

(22) Filed: Jun. 30, 2023

(65) Prior Publication Data

US 2023/0341525 A1  Oct. 26, 2023

Related U.S. Application Data

(63) Continuation of application No. PCT/CN2021/131172, filed on Nov. 17, 2021.

(30) Foreign Application Priority Data

Jan. 5, 2021 (CN) .......................... 202110008506.7

(51) Int. Cl.
*G01S 7/481* (2006.01)
*G01S 17/42* (2006.01)

(52) U.S. Cl.
CPC .......... *G01S 7/4817* (2013.01); *G01S 7/4818* (2013.01); *G01S 17/42* (2013.01)

(58) Field of Classification Search
CPC ...... G01S 7/4817; G01S 7/4818; G01S 17/42; G01S 7/4811; H01S 5/4087
(Continued)

(56) References Cited

U.S. PATENT DOCUMENTS

| 9,787,409 B1 | 10/2017 | Ladd | |
|---|---|---|---|
| 2002/0093893 A1* | 7/2002 | Matsuda | .............. G11B 7/1353 |

(Continued)

FOREIGN PATENT DOCUMENTS

| CN | 106125063 A | 11/2016 | |
|---|---|---|---|
| CN | 107422422 A * | 12/2017 | ........... G02B 6/2938 |

(Continued)

OTHER PUBLICATIONS

Extended European Search Report in European Appln No. 21917177.4, dated Sep. 2, 2024, 16 pages.

(Continued)

*Primary Examiner* — Md M Rahman
(74) *Attorney, Agent, or Firm* — Fish & Richardson P.C.

(57) ABSTRACT

An example detection apparatus includes a sending and receiving assembly, configured to transmit N emitted sub-beams to target scanning space at different emission angles, and converge N reflected sub-beams into a reflected beam, where wavelengths of the N emitted sub-beams are different from each other. The emission angles correspond to the wavelengths of the emitted sub-beams, the N reflected sub-beams are beams formed through reflection after the N emitted sub-beams detect at least one detection object, and N is a positive integer greater than 1. The detection apparatus includes a wavelength division assembly, configured to obtain, based on the reflected beam, the N reflected sub-beams corresponding to different wavelengths. The detection apparatus includes a detector array, configured to output corresponding electrical signals based on the N reflected sub-beams from the wavelength division assembly, where the detector array includes N detectors, and the N detectors correspond to the N reflected sub-beams.

17 Claims, 9 Drawing Sheets

(58) Field of Classification Search
USPC .......................................................... 356/27
See application file for complete search history.

(56) References Cited

U.S. PATENT DOCUMENTS

| | | |
|---|---|---|
| 2008/0089698 A1 | 4/2008 | Jiang et al. |
| 2018/0306925 A1 | 10/2018 | Hosseini et al. |
| 2019/0257927 A1 | 8/2019 | Yao |
| 2019/0310498 A1 | 10/2019 | Xu et al. |
| 2019/0353977 A1 | 11/2019 | Hung |
| 2020/0217961 A1 | 7/2020 | Russo et al. |

FOREIGN PATENT DOCUMENTS

| | | | | |
|---|---|---|---|---|
| CN | 108303701 A | 7/2018 | | |
| CN | 108562887 A | 9/2018 | | |
| CN | 110244307 A | 9/2019 | | |
| CN | 110720054 A | 1/2020 | | |
| CN | 110998365 A | 4/2020 | | |
| CN | 111913164 A | 11/2020 | | |
| CN | 112833823 A | * 5/2021 | ............. | G01B 11/26 |
| CN | 113219436 A | 8/2021 | | |

OTHER PUBLICATIONS

Trocha et al., "Ultrafast optical ranging using microresonator soliton frequency combs," arXiv:1707.05969v2 [physics.optics], Jul. 20, 2017, 9 pages.

International Search Report and Written Opinion in International Appln. No. PCT/CN2021/131172, mailed on Jan. 27, 2022, 21 pages (with English translation).

Partial Supplementary European Search Report in European Appln. No. 21917177.4, mailed on Apr. 29, 2024, 15 pages.

* cited by examiner

Horizontal scanning implemented through translation of a multi-wavelength detection beam Vertical scanning implemented by using a multi-wavelength detection beam

| $\lambda_{1,1}$ | $\lambda_{1,2}$ | $\lambda_{1,3}$ | ... | $\lambda_{1,n}$ |
|---|---|---|---|---|
| $\lambda_{2,1}$ | $\lambda_{2,2}$ | $\lambda_{2,3}$ | ... | $\lambda_{2,n}$ |
| $\lambda_{3,1}$ | $\lambda_{3,2}$ | $\lambda_{3,3}$ | ... | $\lambda_{3,n}$ |
| ... | ... | ... | ... | ... |
| $\lambda_{k,1}$ | $\lambda_{k,2}$ | $\lambda_{k,3}$ | ... | $\lambda_{k,n}$ |

DETECTION APPARATUS, LASER RADAR SYSTEM, AND TERMINAL

CROSS-REFERENCE TO RELATED APPLICATIONS

This application is a continuation of International Application No. PCT/CN2021/131172, filed on Nov. 17, 2021, which claims priority to Chinese Patent Application No. 202110008506.7, filed on Jan. 5, 2021. The disclosures of the aforementioned applications are hereby incorporated by reference in their entireties.

TECHNICAL FIELD

This application relates to the field of laser radar technologies, and in particular, to a detection apparatus, a laser radar system, and a terminal.

BACKGROUND

A laser detection apparatus, that is, laser radar (Light Detection And Ranging, LiDAR), is an apparatus that emits a laser beam to detect characteristics such as a position and a speed of a target. The laser detection apparatus is configured to sense an ambient environment parameter, is known as an "eye" of a machine, and is widely used in fields such as surveying and mapping, detection, and automated driving.

To improve a scanning speed, existing laser radar usually uses a multi-line structure. A working principle of the existing laser radar is shown in FIG. 1a. A plurality of photoelectric detectors are arranged in a vertical direction to form a detector array, and reflected light of different direction angles is gathered onto different photoelectric sensors by using a focusing lens, to implement vertical scanning. Then, three-dimensional space scanning may be implemented by using a horizontal rotating sending and receiving mechanism. However, in a laser radar system of this structure, due to a plurality of factors such as performance of the focusing lens and beam performance, optical signals received by a photoelectric detector may include an optical signal outside a direction angle corresponding to a design of the photoelectric detector, thereby affecting detection accuracy. As shown in FIG. 1b, a strong reflection target not only causes a response on a photoelectric detector corresponding to the strong reflection target, but also causes a detector around the photoelectric detector corresponding to the strong reflection target to generate a weak response, thereby causing crosstalk.

Therefore, there is an urgent need to develop a laser detection apparatus that can effectively avoid crosstalk.

SUMMARY

Embodiments of this application provide a detection apparatus, where beams of a plurality of wavelengths are emitted, so that different detectors receive beams of different wavelengths, thereby effectively resolving a problem of crosstalk between detectors of an existing detection apparatus.

To achieve the foregoing objective, the following technical solutions are used in the embodiments of this application.

This application provides a laser detection apparatus, including: a sending and receiving assembly, configured to transmit N emitted sub-beams to target scanning space at different emission angles, and converge N reflected sub-beams into a reflected beam, where wavelengths of the N emitted sub-beams are different from each other, the emission angles correspond to the wavelengths of the emitted sub-beams, the N reflected sub-beams are beams formed through reflection after the N emitted sub-beams detect at least one detection object, and N is a positive integer greater than 1; a wavelength division assembly, configured to obtain, based on the reflected beam, the N reflected sub-beams corresponding to different wavelengths; and a detector array, configured to output corresponding electrical signals based on the N reflected sub-beams from the wavelength division assembly, where the detector array includes N detectors, and the N detectors correspond to the N reflected sub-beams.

The detection apparatus in this embodiment of this application uses the sending and receiving assembly to transmit beams of different wavelengths to the target scanning space at different emission angles, and converge the beams to the wavelength division assembly. The wavelength division assembly distributes the beams of different wavelengths to different detectors, so that the different detectors receive the beams of different wavelengths, thereby fundamentally resolving a problem of crosstalk between detectors.

In another possible implementation, a laser generation assembly is further included. The laser generation assembly generates a detection beam including the N emitted sub-beams, and transmits the detection beam to the sending and receiving assembly.

In another possible implementation, the wavelength division assembly includes at least a wavelength division multiplexer, the wavelength division multiplexer includes N wavelength channels, the N wavelength channels respectively correspond to the wavelengths of the N reflected sub-beams, and the N detectors respectively correspond to output ends of the N wavelength channels.

In a wavelength division demultiplexing manner, the wavelength division multiplexer implements optical channel separation, which has stable performance and extremely high isolation and is not affected by a structural design of the sending and receiving assembly. This overcomes a problem of crosstalk between channels that is caused by a non-ideal characteristic of a focusing device and that is difficult to overcome in a conventional solution for implementing optical channel separation based on a space dimension, and has controllable costs and high solution feasibility.

In another possible implementation, to further implement optical channel separation, the wavelength division assembly further includes N filter elements. Pass-through wavelengths of the N filter elements correspond to the wavelengths of the N reflected sub-beams, and the N filter elements are respectively disposed between the output ends of the N wavelength channels and the N detectors, so that different detectors receive beams of different wavelengths.

In another possible implementation, an optical circulator is further included. The optical circulator includes at least a first port, a second port, and a third port, an optical channel is formed from the first port to the second port, and an optical channel is formed from the second port to the third port. The first port is connected to the laser generation assembly, the second port is connected to the sending and receiving assembly, and the third port is connected to the wavelength division assembly.

The optical circulator is disposed, so that the sending and receiving assembly transmits beams to the target scanning space, and receives transmitted beams and converges the transmitted beams to the wavelength division assembly, to separate beams of different wavelengths.

In another possible implementation, the laser generation assembly includes at least a single-frequency laser and an optical resonant cavity.

The single-frequency laser is configured to emit single-frequency laser light, and the optical resonant cavity is disposed on a transmission path of the single-frequency laser light, and is configured to act on the single-frequency laser light to generate M sub-beams, where wavelengths of the M sub-beams are different from each other, and M is a positive integer greater than or equal to N.

In another possible implementation, the laser generation assembly further includes a spectrum shaping assembly.

The spectrum shaping assembly is configured to obtain N sub-beams from the M sub-beams, where wavelengths of any two of the N sub-beams are different, and a power difference between any two of the N sub-beams is less than or equal to a preset threshold.

In another possible implementation, the laser generation assembly further includes an optical amplifier.

The optical amplifier is configured to increase power of each of the N sub-beams by a preset multiple to form the N emitted sub-beams.

In another possible implementation, spacings between adjacent wavelengths of the N emitted sub-beams are equal.

The sending and receiving assembly includes at least a vertical transmit assembly, configured to transmit the emitted sub-beams of different wavelengths to the target scanning space at different pitch angles.

In another possible implementation, the laser generation assembly is further configured to adjust a quantity of N emitted sub-beams in the detection beam and/or adjust the spacings between adjacent wavelengths of the N emitted sub-beams.

In another possible implementation, the vertical transmit assembly includes at least a collimator and a convex lens.

The collimator is disposed on a focal plane of the convex lens and deviates from a focal point of the convex lens, and is configured to collimate the detection beam and make the detection beam incident onto the convex lens.

In another possible implementation, the vertical transmit assembly includes at least a collimator and a diffraction grating.

The collimator is configured to collimate the detection beam and make the detection beam incident onto the diffraction grating.

The vertical transmit assembly in this embodiment of this application implements solid-state scanning in a vertical direction, thereby avoiding problems such as poor reliability, low precision, and high costs of a mechanical rotary scanning mechanism of an existing detection apparatus.

In another possible implementation, the laser generation assembly is further configured to sequentially adjust the wavelengths of the N emitted sub-beams as a whole in a preset wavelength range.

The sending and receiving assembly further includes at least a horizontal transmit assembly.

The horizontal transmit assembly is disposed on a transmission path of a beam transmitted by the vertical transmit assembly, and is configured to transmit the emitted sub-beams of different wavelengths to the target scanning space at different azimuths based on different wavelengths.

In another possible implementation, the horizontal transmit assembly includes at least one optical dispersion element, which is disposed on the transmission path of the beam transmitted by the vertical transmit assembly and transmits the emitted sub-beams of different wavelengths to the target scanning space at different azimuths.

In another possible implementation, the horizontal transmit assembly further includes at least one convex reflector, and the convex reflector is disposed on a transmission path of a reflected beam of the optical dispersion element.

In another possible implementation, the spacings between adjacent wavelengths are greater than the preset wavelength range.

The horizontal transmit assembly in this embodiment of this application implements solid-state scanning in a horizontal direction, and implements three-dimensional scanning of target detection space in combination with the vertical transmit assembly.

In another possible implementation, the sending and receiving assembly further includes at least a horizontal scanning assembly. The horizontal scanning assembly is disposed on a transmission path of a beam transmitted by the vertical transmit assembly. The horizontal scanning assembly includes a reflective surface, and the reflective surface rotates around an axis in the vertical direction to reflect, to the target scanning space at different time and at different angles, beams transmitted by the vertical transmit assembly, to implement scanning in the horizontal direction.

Optionally, the horizontal scanning assembly includes at least an MEMS scanning assembly.

In another possible implementation, the laser generation assembly includes at least a wideband laser, configured to emit wideband laser light.

In another possible implementation, the laser generation assembly further includes a spectrum shaping assembly. The spectrum shaping assembly is disposed on a transmission path of laser light generated by the wideband laser and is configured to obtain N sub-beams of different wavelengths.

In another possible implementation, the laser generation assembly further includes an optical amplifier, configured to increase power of each of the N sub-beams by a preset multiple.

According to a second aspect, this application further provides a laser radar system, including at least the detection apparatus according to the first aspect.

According to a third aspect, this application further provides a terminal, including at least the detection apparatus according to the first aspect or the laser radar system according to the second aspect.

BRIEF DESCRIPTION OF DRAWINGS

The following briefly describes accompanying drawings that need to be used in descriptions of embodiments or a conventional technology.

DESCRIPTION OF EMBODIMENTS

The following describes technical solutions in embodiments of this application with reference to accompanying drawings in embodiments of this application.

In descriptions of this application, positions or position relationships indicated by terms "center", "up", "down", "in front of", "behind", "left", "right", "vertical", "horizontal", "top", "bottom", "inside", "outside", and the like are based on positions or position relationships shown in the accompanying drawings, and are merely intended for ease of describing this application and simplifying descriptions, instead of indicating or implying that a mentioned apparatus or component needs to be provided in a specific position or constructed and operated in a specific position, and therefore shall not be understood as limitations on this application.

In the descriptions of this application, it should be noted that, unless otherwise clearly specified and limited, terms "mount", "link", and "connect" should be understood in a broad sense, for example, may mean a fixed connection, may mean a detachable connection, or may mean a butt joint connection or an integrated connection. A person of ordinary skill in the art can understand specific meanings of the foregoing terms in this application based on specific cases.

A working principle of a laser detection apparatus (that is, LiDAR, laser radar) is to emit a laser beam to a detection target, and then receive a reflected laser beam reflected by the detection target. Different detectors determine parameters such as a distance, a moving speed, a position, a height, a posture, and a shape of a detected target based on reflected laser beams reflected by different detection targets.

Different detectors have different optical channels, and different optical channels correspond to reflected laser beams reflected by different detection targets. If a reflected laser beam reflected by a detection target enters another optical channel and causes a response of another detector, crosstalk occurs, and accuracy of the laser detection apparatus for the detection target is severely affected.

To resolve a crosstalk problem of an existing laser detection apparatus, crosstalk impact is generally eliminated by using algorithm threshold filtering. However, algorithm threshold filtering inevitably causes loss of information of a reflected laser beam, and affects performance of the laser detection apparatus.

In a first solution, a detector array is designed as a single photon avalanche detector (SPAD, Single photon avalanche detector) pixel array with an interleaved structure to receive an optical signal, to reduce crosstalk.

Figure 1A:
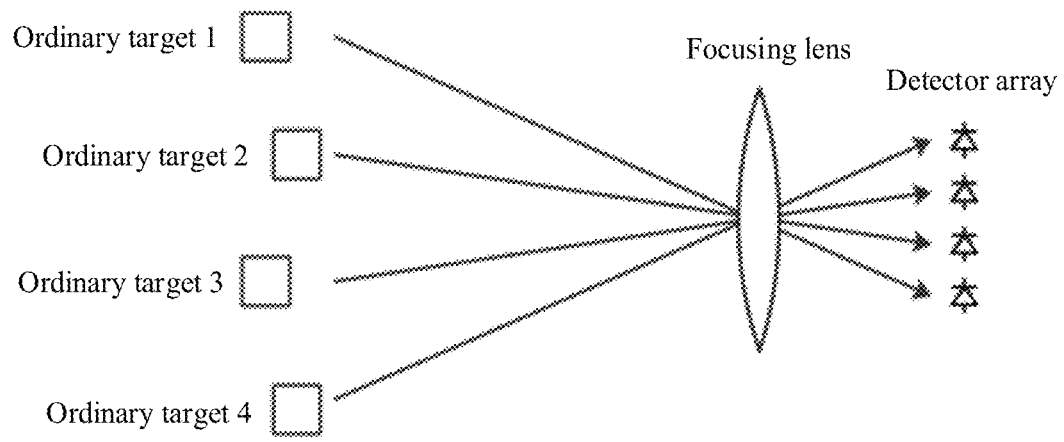
FIG. 1*a* is a working principle diagram of existing laser radar.
Figure 1B:
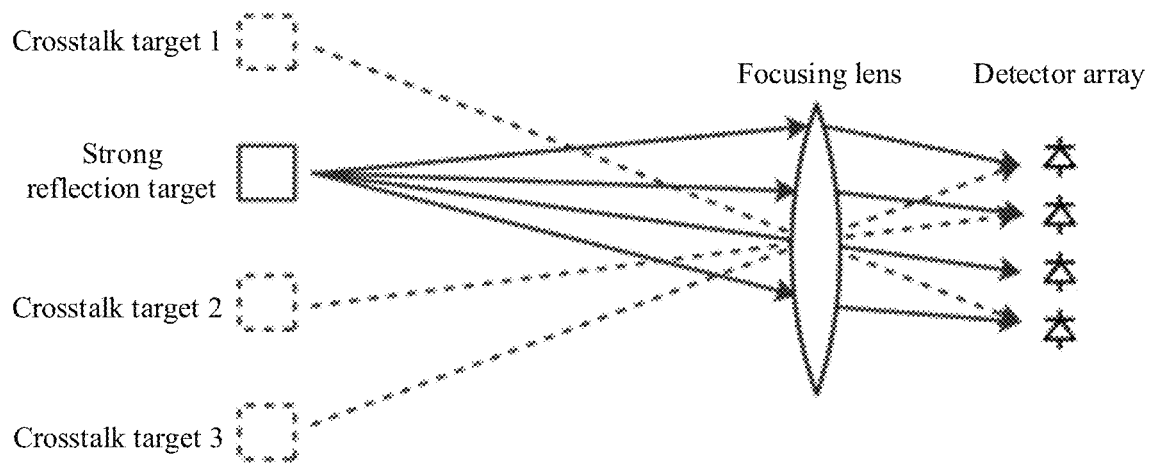
FIG. 1*b* is a schematic diagram of crosstalk generated by existing laser radar.
Figure 2A:
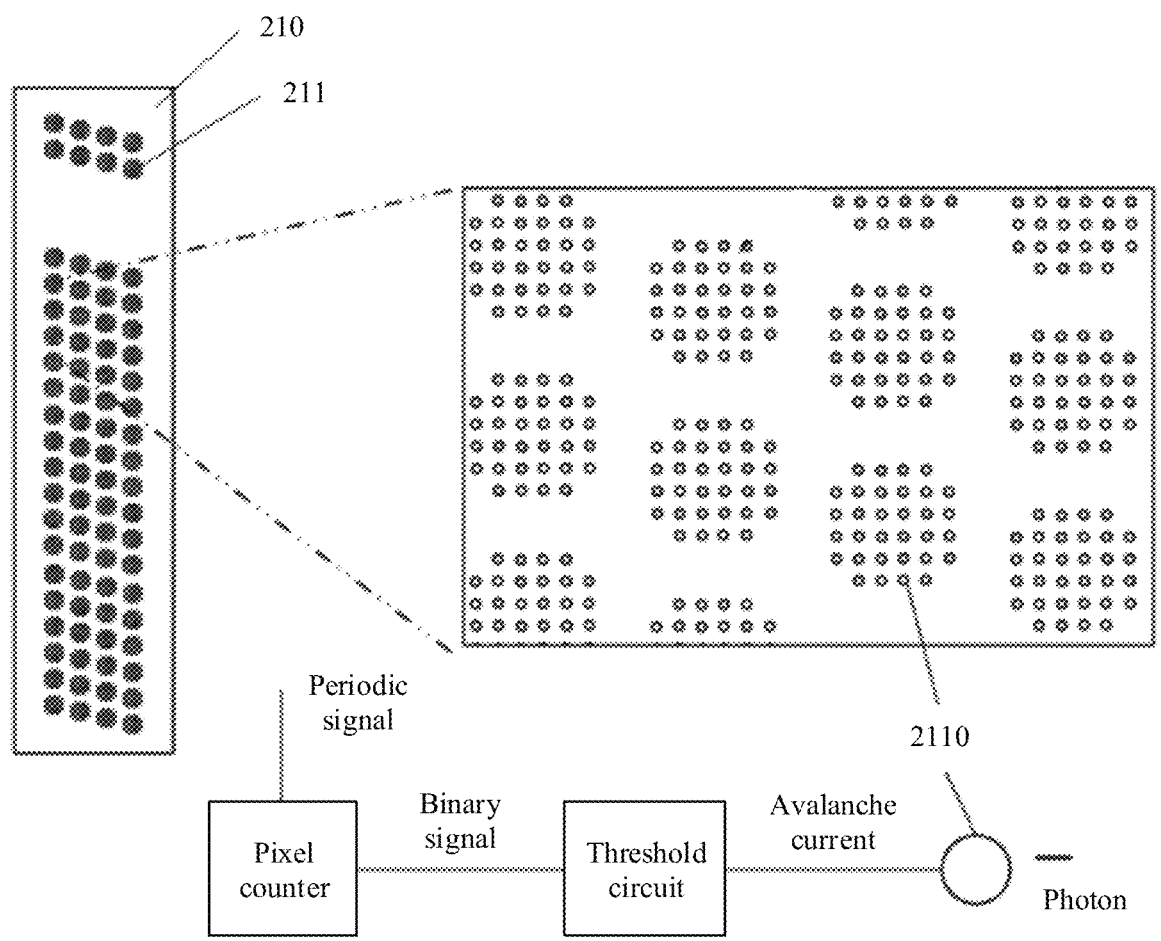
FIG. 2*a* is a schematic diagram of a structure of a single photon avalanche detector pixel array according to a first solution.

FIG. 2a is a schematic diagram of a structure of a single photon avalanche detector pixel array. As shown in FIG. 2, the single photon avalanche detector pixel array 210 includes an array of pixels 211, and a pixel 211 includes a plurality of single photon avalanche detectors (SPADs) 2110. The pixel 211 is equivalent to an independent photoelectric detector. After optical pulses are converged and irradiated onto a pixel 211 by using a lens, different SPADs in the pixel independently respond to an optical signal, and report detected photon data and a corresponding delay. Then, a pixel is used as a minimum unit, and responses of SPADs are accumulated in a pixel to obtain and output a final detection structure of the pixel.

In the first solution, a pixel arrangement manner is improved, and a rectangular arrangement in a mainstream framework is adjusted to a parallelogram arrangement, so that a distance between pixels is increased without reducing pixel density. Therefore, in a case of a long distance and a large light spot, this solution can effectively alleviate a crosstalk problem caused when one light spot covers a plurality of pixels.

However, in this solution, the pixel distance is increased by using an interleaved pixel arrangement, and a distance increase rate is not significant. It is assumed that a horizontal distance and a vertical distance between pixels are equal. In this case, an increase of the horizontal distance cannot exceed 11.8%, and a crosstalk suppression effect is poor. In addition, this solution is applicable only to a scenario in which a horizontal distance needs to be increased, and cannot be applied to a scenario in which a single-column detector array is used.

In a second solution, a sending and receiving system is reconstructed, and a laser beam with high collimation performance is emitted, to suppress crosstalk between different detector channels.

Figure 2B:
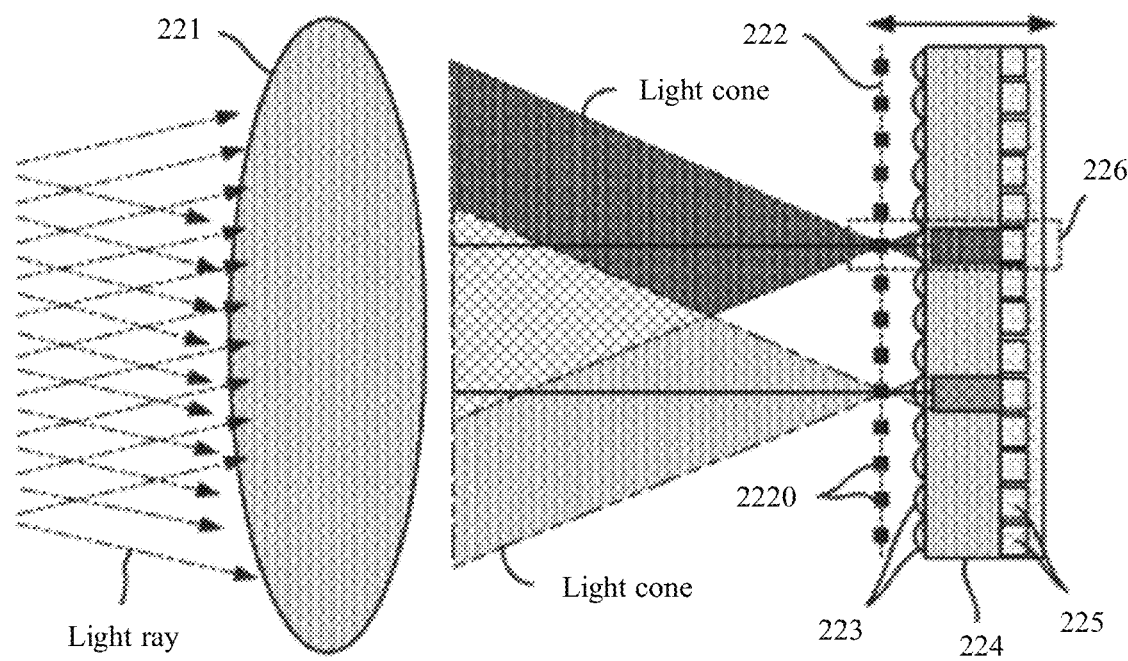
FIG. 2*b* is a schematic diagram of a structure of a sending and receiving system according to a second solution.

FIG. 2b is a schematic diagram of a structure of a sending and receiving system according to the second solution. As shown in FIG. 2b, the sending and receiving system includes a lens 221 and a micro-optical layer that sequentially includes an aperture layer 222, a collimation lens layer, an optical filter layer 224, and a photoelectric detector layer. The aperture layer 222 is an aperture array including a plurality of apertures 2220, the collimation lens layer is a collimation lens array including a plurality of collimation lenses 223, the optical filter layer 224 is an optical filter array including a plurality of optical filters, and the photoelectric detector layer is a photoelectric detector array including a plurality of photoelectric detectors 225. Each aperture in the aperture array, each collimation lens in the collimation lens array, each optical filter in the optical filter array, and each photoelectric detector in the photoelectric detector array are disposed in a one-to-one correspondence. Each aperture and a collimation lens, an optical filter, and a photoelectric detector that are corresponding to the aperture form an optical channel of each photoelectric detector.

Optical paths that are reflected by detection targets and that have different angles are converged at different positions on a surface of the micro-optical layer by using the lens 221. The aperture layer 222 in the micro-optics has corresponding openings for optical channels of different photoelectric detectors to implement optical receiving, and filters out light at other positions in a physical manner, to reduce crosstalk between channels. After passing through the aperture layer, diverged beams are re-converged by a corresponding collimation lens 223 into a collimated beam, and after external ambient light interference is further eliminated by using an optical filter, the collimated beam is received by a photoelectric detector corresponding to a channel. In this solution, performance of a receiving optical system is optimized by using the micro-optical layer.

However, in this solution, the micro-optical layer needs to be fabricated and accurately aligned with a lens system. This imposes a very high requirement on a manufacturing process, costs are excessively high, and the process is complex. In addition, this solution still implements isolation between channels in a spatial dimension. In a particular case (for example, a short-distance high-strength point reflection target), an anti-crosstalk capability of the solution is limited.

In a third solution, an optical phased array is implemented by using a liquid crystal panel, the liquid crystal panel is modulated to form a liquid crystal phased array, and an emission angle of a beam reflected by the liquid crystal phased array is controlled, to implement scanning.

Figure 2C:
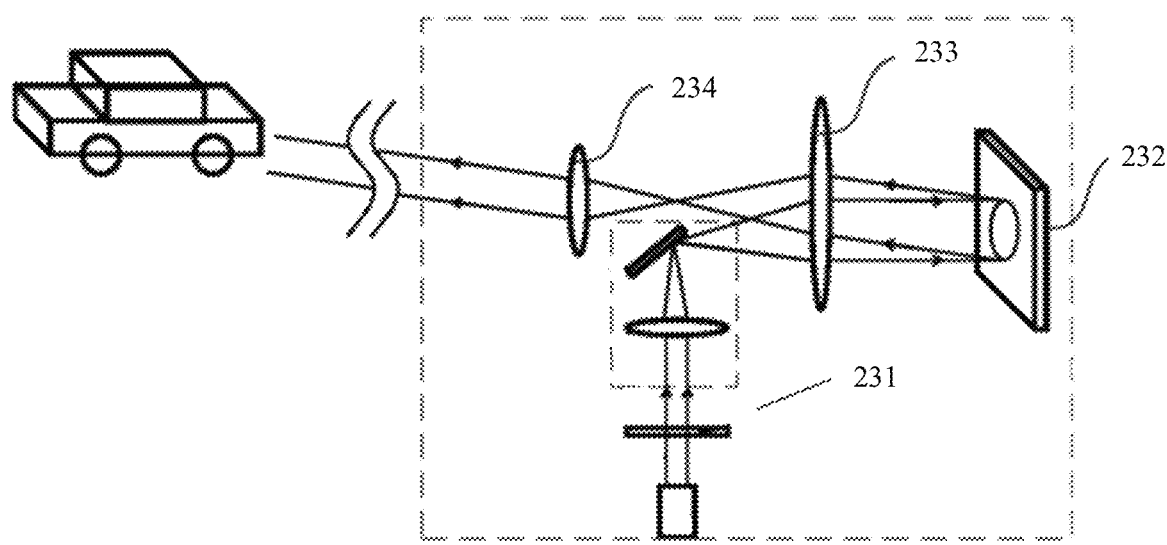
FIG. 2*c* is a schematic diagram of a working principle of a detection apparatus according to a third solution.

FIG. 2c is a schematic diagram of a working principle of a detection apparatus according to the third solution. As shown in FIG. 2c, a laser emission module 231 generates a laser beam and transmits the laser beam to a lens 233, and the lens 233 collimates the laser beam, so that the laser beam is irradiated onto a liquid crystal phased array 232. Different voltages are applied to positions of the liquid crystal phased array 232, so that a phase difference between emitted light at different positions may be controlled. A phase of each position of the liquid crystal phased array 232 is properly adjusted, so that a beam with a controllable emission angle may be obtained through interference between beams, to implement scanning on a target. This avoids crosstalk impact in terms of a system architecture.

However, in this technical solution, on one hand, there are problems of a relatively low liquid crystal electric control frequency, a low phase switching speed, and poor phase control precision, resulting in a relatively low scanning speed, low emission angle control precision, and severe side lobe impact. On the other hand, because a component related to a phased array technology is still under research at present, there is no mature solution that can be mass produced, and technical feasibility is relatively low.

In comprehensive consideration of the foregoing factors, embodiments of this application provide a detection apparatus. Different detector channels are separated in a wavelength dimension, to suppress channel crosstalk. A laser sending and receiving assembly is constructed by using a focus bias structure or properly deploying a diffraction optical device, so that light with a same emission position and different wavelengths can be transmitted at different emission angles after entering the optical sending and receiving assembly, and there is a relatively linear correlation between a wavelength and an emission angle. At a receive end, optical signals with different emission angles and corresponding wavelengths are received in a centralized manner, and beams with different wavelengths are separated by using an optical fiber wavelength division multiplexer, and are separately received by each channel. Thanks to a good wavelength selection characteristic of an optical fiber device, channel isolation of the detection apparatus is significantly increased, and crosstalk between channels is effectively suppressed.

With reference to the accompanying drawings, the following describes in detail the detection apparatus provided in embodiments of this application.

Figure 3:
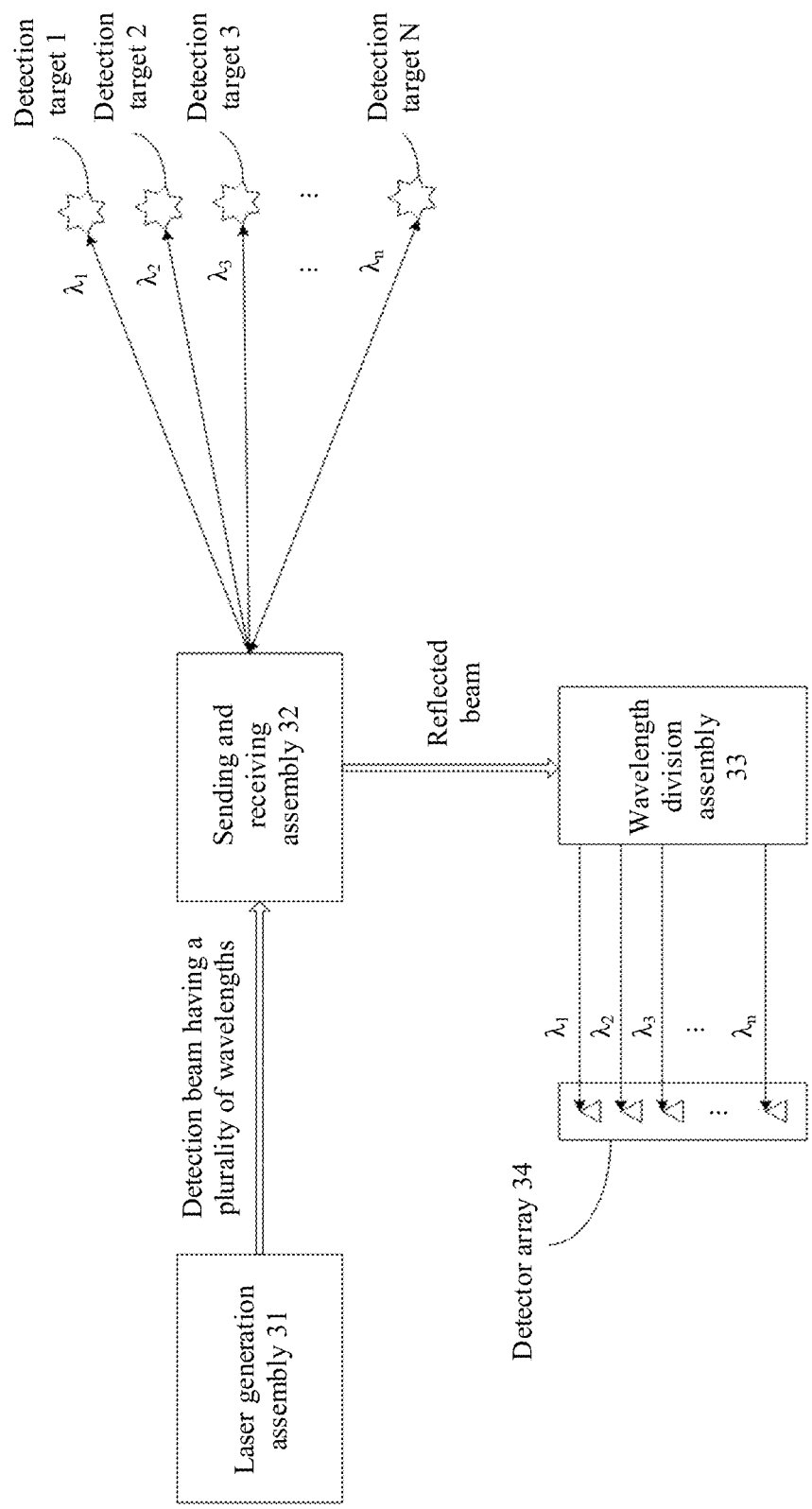
FIG. 3 is a schematic diagram of a structure of a detection apparatus according to an embodiment of this application.

FIG. 3 is a schematic diagram of a structure of a detection apparatus according to an embodiment of this application. As shown in FIG. 3, the detection apparatus provided in this embodiment of this application includes but is not limited to at least one of a laser generation assembly 31, a sending and receiving assembly 32, a wavelength division assembly 33, and a detector array 34. The laser generation assembly 31 generates a detection beam having a plurality of wavelength components. The sending and receiving assembly 32 is deployed on a transmission path of the detection beam generated by the laser generation assembly 31, and transmits sub-beams having different wavelength components in the detection beam to target detection space at different emission angles based on different wavelengths. After meeting detection targets (for example, a detection target 1, a detection target 2, a detection target 3, . . . , and a detection target N in FIG. 3), sub-beams of different wavelengths are reflected by the detection targets to form reflected sub-beams of different wavelengths. The sending and receiving assembly converges the reflected sub-beams of different wavelengths into a reflected beam, and transmits the reflected beam to the wavelength division assembly 33. The wavelength division assembly splits the reflected beam into the reflected sub-beams of different wavelengths based on different wavelengths, and allocates the reflected sub-beams of different wavelengths to different detectors in the detector array 34. The detectors output corresponding electrical signals based on different reflected sub-beams. In this way, different detector channels are isolated in a wavelength dimension, and a problem of crosstalk between different detector channels is fundamentally resolved.

Embodiment 1

Figure 4:
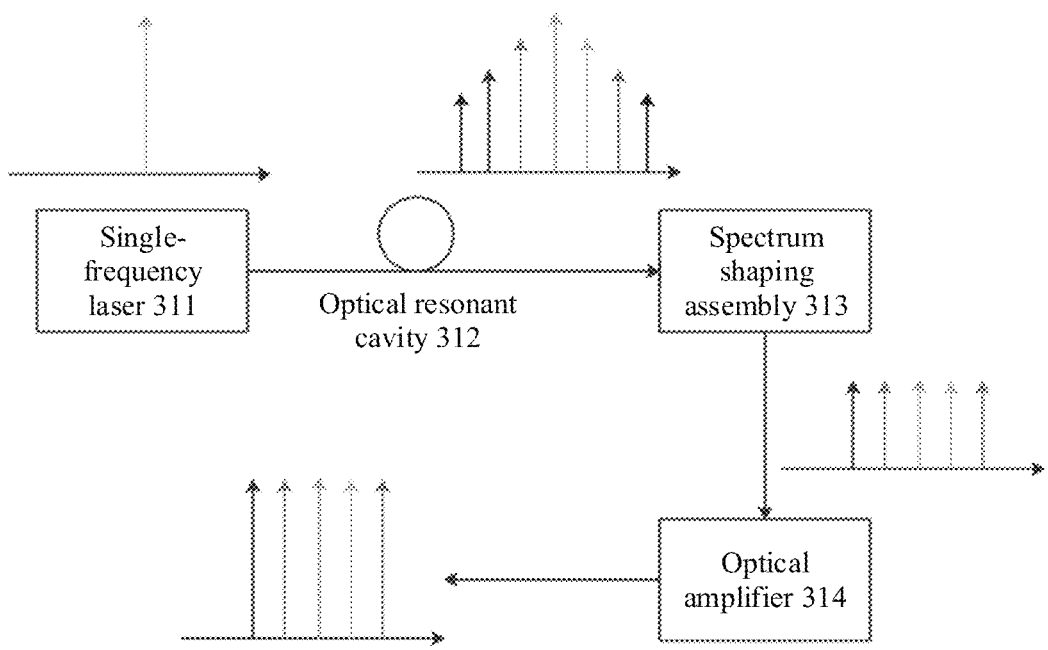
FIG. 4 is a schematic diagram of a structure of a laser generation assembly according to Embodiment 1 of this application.

FIG. 4 is a schematic diagram of a structure of a laser generation assembly according to Embodiment 1 of this application. As shown in FIG. 4, the laser generation assembly includes a single-frequency laser 311, an optical resonant cavity 312 disposed on a transmission path of a laser beam emitted by the single-frequency laser, a spectrum shaping assembly 313, and an optical amplifier 314. The optical resonant cavity, the spectrum shaping assembly, and the optical amplifier may be sequentially disposed.

The single-frequency laser 311 emits single-frequency laser light. The single-frequency laser light passes through the optical resonant cavity 312, and multi-wavelength laser beams having M (M is a positive integer greater than or equal to N) wavelength components are generated due to a strong non-linear effect. The multi-wavelength laser beams enter the spectrum shaping assembly 313 for spectrum shaping, so that redundant wavelength components in the multi-wavelength laser beams are filtered out to obtain laser beams having N (N is a positive integer greater than 1) wavelength components, and power of the wavelength components is flattened. Finally, the laser beams are amplified by the optical amplifier 314 to improve a detection signal-to-noise ratio and a measurement distance, and are sent to a sending and receiving assembly to transmit the laser beams (that is, N emitted sub-beams) having N wavelength components to detection space at different emission angles based on different wavelengths for detection and scanning.

Optionally, the optical resonant cavity 312 is an optical microring resonant cavity, and the optical microring resonant cavity may act on the single-frequency laser light to generate hundreds of wavelength components with a spacing of 1 nm to 2 nm between adjacent wavelengths. A quantity of wavelength components and the spacing between adjacent wavelengths may be correspondingly adjusted by adjusting a status of the optical microring resonant cavity. In consideration of a subsequent scanning and detection effect, laser beams having a plurality of wavelength components with equal or similar spacings between adjacent wavelengths may be obtained by adjusting the optical microring resonant cavity.

Optionally, the spectrum shaping assembly 313 includes an optical spectrum shaper, a filter, or the like, and may be any optical assembly that can select specific wavelength components and flatten power of the wavelength components. This is not limited in this application.

In some implementations, the laser generation assembly may alternatively include only the single-frequency laser 311 and the optical resonant cavity 312 disposed on the transmission path of the laser beam emitted by the single-frequency laser. The optical resonant cavity 312 directly acts on single-frequency laser beams to generate laser beams having M wavelength components, and directly sends the laser beams having the M wavelength components to the sending and receiving assembly to complete detection and scanning.

In some other implementations, the laser generation assembly may alternatively include only the single-frequency laser 311, the optical resonant cavity 312 disposed on the transmission path of the laser beam emitted by the single-frequency laser, and the spectrum shaping assembly 313. The spectrum shaping assembly 313 filters out redundant wavelength components from laser beams that have M wavelength components and that are generated by the optical resonant cavity, to obtain laser beams having N wavelength components; flattens power of the wavelength components; and sends the laser beams having the N wavelength components to the sending and receiving assembly to complete detection and scanning.

Figure 5:
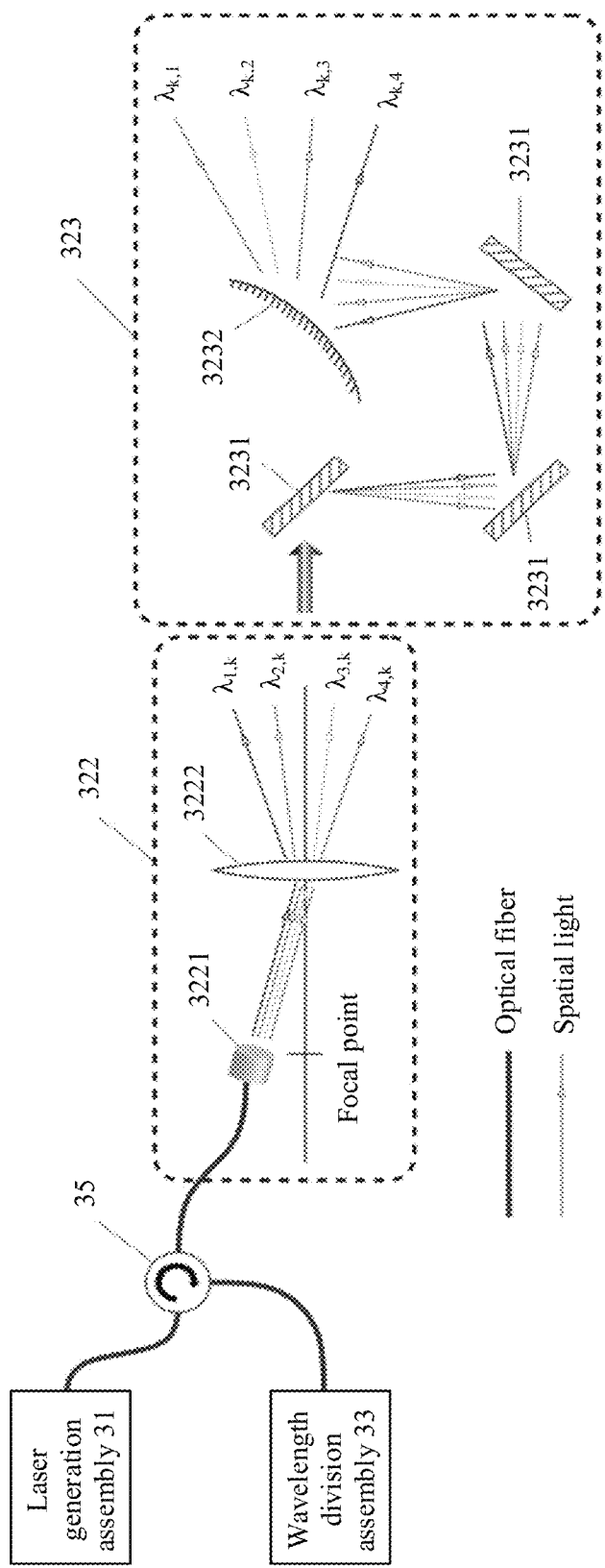
FIG. 5 is a schematic diagram of a structure of a sending and receiving assembly according to Embodiment 1 of this application.

FIG. 5 is a schematic diagram of a structure of a sending and receiving assembly according to Embodiment 1 of this application. As shown in FIG. 5, the sending and receiving assembly 32 includes a vertical transmit assembly 322 and a horizontal transmit assembly 323. The sending and receiving assembly 32 is mutually coupled to the laser generation assembly 31 and a wavelength division assembly 33 by using an optical circulator 35. Optical fibers are used to separately connect the laser generation assembly 31 and a first port of the optical circulator 35, the sending and receiving assembly 32 and a second port of the optical circulator 35, and the wavelength division assembly 33 and a third port of the optical circulator 35, so that a detection beam generated by the laser generation assembly 31 enters the optical circulator 35 through the first port and is transmitted to the sending and receiving assembly through the second port, and a reflected beam received by the sending and receiving assembly 32 enters the optical circulator 35 through the second port and is transmitted to the wavelength division assembly 33 through the third port. This implements reciprocity between receiving and sending of the sending and receiving assembly, helps simplify a system structure, and improves receiving and sending efficiency.

Certainly, in this application, an optical transmission medium between the laser generation assembly, the optical circulator, the sending and receiving assembly, and the wavelength division assembly is not limited to an optical fiber, and another optical transmission medium such as air may alternatively be used.

In a design, the vertical transmit assembly 322 includes a collimator 3221 and a convex lens 3222. The collimator 3221 is deployed on a focal plane of the convex lens 3222 and deviates from a focal point of the convex lens 3222, so that the laser beams having the N wavelength components in the detection beam are collimated and made incident onto different positions of the convex lens. In this way, there is an optical path difference between the laser beams having the N wavelength components. The optical path difference causes interference after incident light arrives at a surface of the convex lens, and only light at a specific angle can be emitted. The specific angle is related to an optical wavelength, and conversion from an incident light wavelength to an angle of emergence is implemented. That is, the laser beams having the N wavelength components are transmitted to target scanning space at different pitch angles based on different wavelengths.

In addition, solid-state scanning in a vertical direction is also implemented, thereby avoiding problems such as poor reliability, low precision, and high costs of a mechanical rotating structure in conventional laser radar.

Certainly, the vertical transmit assembly 322 is not limited to a structure of a collimator and a convex lens, as long as a function of transmitting at different emission angles based on different wavelengths may be implemented. For example, the convex lens may alternatively be replaced with a diffraction grating. The collimator makes the detection beam incident onto a surface of the diffraction grating, and an interference phenomenon occurs, so that the laser beams having the N wavelength components are transmitted to the target scanning space at different pitch angles based on different wavelengths.

The horizontal transmit assembly 323 is deployed on a transmission path of a beam transmitted by the vertical transmit assembly, includes at least one optical dispersion element, and transmits laser beams of different wavelengths to the target scanning space at different azimuths. The laser generation assembly sequentially adjusts wavelengths of the laser beams having the N wavelength components as a whole in a preset wavelength range. For example, the single-frequency laser sequentially emits single-frequency laser light of different center wavelengths, to implement small-range overall adjustment of the laser beams having the N wavelength components, thereby implementing three-dimensional solid-state scanning of target space. Herein, it should be explained that a meaning of sequentially adjusting wavelengths of the laser beams having the N wavelength components as a whole is that the laser generation assembly adjusts the wavelengths of the laser beams having the N wavelength components as a whole at different time. For example, wavelengths of laser beams that have N wavelength components and that are generated by the laser generation assembly at a first moment are respectively $\lambda 1$, $\lambda 2, \ldots$, and $\lambda n$; wavelengths of laser beams that have N wavelength components and that are generated by the laser generation assembly at a second moment are adjusted as a whole to $\lambda 1+\Delta\lambda, \lambda 2+\Delta\lambda, \ldots$, and $\lambda n+\Delta\lambda$; wavelengths of laser beams having N wavelength components at a third moment are adjusted as a whole to $\lambda 1+2\Delta\lambda, \lambda 2+2\Delta\lambda, \ldots$, and $\lambda n+2\Delta\lambda$, and so on; and wavelengths of laser beams having N wavelength components at a $k^{th}$ moment are adjusted as a whole to $\lambda 1+(k-1)\Delta\lambda, \lambda 2+(k-1)\Delta\lambda, \ldots$, and $\lambda n+(k-1)\Delta\lambda$. It may be understood that in practical application, an electromagnetic wave having only a single wavelength cannot be generated. Even laser light having highest purity also has a specific wavelength distribution range. For example, if laser light with a wavelength of 1550 nm needs to be generated, laser light with a wavelength of 1549 nm to 1551 nm may be actually generated. The wavelength of 1550 nm has highest light energy, that is, is a center wavelength. That is, the center wavelength is a wavelength of a component with highest energy in a wavelength range.

However, in order that small-range overall adjustment of the laser beams having the N wavelength components affects only a horizontal scanning assembly and does not affect the vertical transmit assembly as much as possible, the horizontal scanning assembly needs to be more sensitive to a wavelength of light than the vertical transmit assembly.

In an example, to improve sensitivity of the horizontal transmit assembly to a wavelength, the optical dispersion element of the horizontal transmit assembly 323 includes a plurality of reflection gratings 3231. One reflection grating receives a beam transmitted by the vertical transmit assembly, and other transmitted beams are sequentially deployed on a reflection path of a previous reflection grating to further increase different reflection angles of beams of different wavelengths, thereby improving sensitivity of the horizontal transmit assembly to a wavelength.

In another example, to further improve sensitivity of the horizontal transmit assembly to a wavelength, a convex reflector 3232 is further disposed in the horizontal transmit assembly 323. The convex reflector 3232 is disposed on a reflection path of a last reflection grating, and beams reflected by the convex reflector 3232 further enable beams of different wavelengths to be transmitted to the target scanning space at further different angles, so that even if a wavelength of a beam slightly changes, the beam can be emitted at a different angle of emergence.

Figures 6, 7:
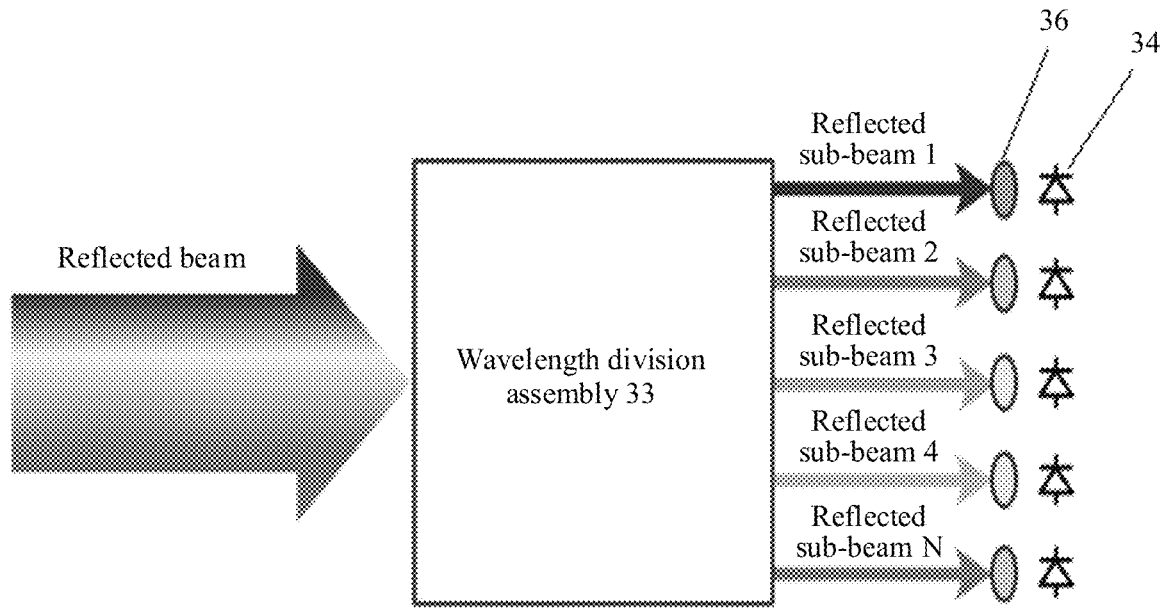
FIG. 6 shows wavelength distribution when a detection apparatus performs detection and scanning according to Embodiment 1 of this application.
FIG. 7 is a schematic diagram of a correspondence between a reflection assembly and a detector array according to Embodiment 1 of this application.

As shown in FIG. 6, if a size of a scanning emission angle matrix of a detection apparatus is n*k, the laser generation assembly emits k detection beams of different wavelengths, and the k detection beams are transmitted by the sending and receiving assembly at k different pitch angles, to implement scanning in the vertical direction. In addition, center wavelengths of single-frequency laser light emitted by the single-frequency laser are sequentially adjusted, so that the k different wavelengths have a small-range overall frequency shift in a spectrum. In this way, horizontal emission angles of k wavelength components consistently change, thereby implementing three-dimensional scanning of the target space.

To ensure that an overall wavelength change does not affect scanning in the vertical direction as much as possible, any wavelength should meet $\lambda_{i,j}-\lambda_{i-1,j}>\lambda_{k,n}-\lambda_{k,1}$. That is, a wavelength change range during horizontal scanning should be less than the spacing between adjacent wavelengths. It may be understood that adjacent wavelengths represent two wavelengths with a smallest wavelength difference in detection beams of different wavelengths. As shown in FIG. 6, $\lambda_{i,j}-\lambda_{i-1,j}$ represents a wavelength spacing between adjacent wavelengths in detection beams of different wavelengths that are emitted during scanning in the vertical direction, and $\lambda_{k,n}-\lambda_{k,1}$ represents a wavelength adjustment range of a sub-beam of any wavelength in detection beams of different wavelengths that are emitted during horizontal scanning.

As shown in FIG. 7, output ports of wavelength channels of the wavelength division assembly 33 are disposed in a one-to-one correspondence with detectors in a detector array 34, so that the wavelength division assembly separates a reflected beam into reflected sub-beams of different wavelengths, and then the reflected sub-beams are incident onto the detectors in the detector array 34, to achieve an objective of isolating detector channels.

To further increase isolation between the detector channels, a filter element array 36 is disposed between the output ports of the wavelength channels of the wavelength division assembly 33 and the detector array. Still referring to FIG. 7, filter elements in the filter element array 36 are disposed in a one-to-one correspondence with the detectors in the detector array 34, that is, the filter elements in the filter element array 36 are disposed in a one-to-one correspondence with the output ports of the wavelength channels of the wavelength division assembly 33. It may be understood that pass-through wavelengths of the filter elements in the filter element array 36 correspond to pass-through wavelengths of the wavelength channels of the wavelength division assembly 33.

A wavelength division multiplexing (Wavelength division demultiplex) technology refers to separating, based on wavelengths, components with different center wavelengths in a beam of light, to form different distinguishable beams. The wavelength division assembly is designed based on the wavelength division multiplexing technology, so that the wavelength division assembly implements functions of receiving an optical signal transmitted by the sending and receiving assembly, splitting the received optical signal based on a wavelength of the received optical signal, and sending beams of various wavelengths obtained through splitting to a photoelectric detector array to complete detection.

Optionally, a dense wavelength division multiplexer widely used in a fiber-optic communication system is selected as the wavelength division assembly. The dense wavelength division multiplexer is widely used in wavelength division multiplexing/demultiplexing in fiber-optic communication, and can meet a function requirement of the wavelength division assembly.

Optionally, the filter element is a narrowband optical filter, the dense wavelength division multiplexer may provide isolation of up to 40 dB, and the optical filter may further provide isolation of over 20 dB, thereby further providing channel isolation.

Certainly, the filter element is not limited to the narrowband optical filter, and may be any optical filter element that can implement a filtering effect in this application, for example, a fiber Bragg grating.

In consideration of a problem that impact caused by an optical characteristic of a focusing device cannot be avoided when conventional laser radar implements isolation between channels by using space, Embodiment 1 of this application creatively proposes using a wavelength dimension to implement isolation between channels. First, a multi-wavelength light source is used to replace a conventional single-wavelength light source to open a new wavelength dimension for a subsequent system. Afterwards, a corresponding wavelength window is configured for each wavelength of the multi-wavelength light source, and a specially designed optical sending and receiving assembly is used, so that different wavelength windows can correspond to different vertical channels, thereby implementing one-to-one mapping from the wavelength windows to the vertical channels. Subsequently, after reflected optical signals of a plurality of wavelengths are received, the reflected optical signals are separated in the wavelength dimension by using the wavelength division assembly. This provides a high separation degree and stable separation performance, and is insensitive to the optical characteristic of the focusing device. Finally, the narrowband optical filter is used at a receive end for further filtering, and vertical channel isolation that is far higher than vertical channel isolation of current laser radar may be obtained, thereby eliminating adverse impact caused by channel crosstalk.

Due to problems such as poor reliability, low precision, and high costs of a mechanical rotary scanning mechanism in conventional laser radar, Embodiment 1 of this application creatively proposes using an improved optical sending and receiving assembly to establish a correlation characteristic between a wavelength and a scanning angle, to implement emission angle scanning by changing a wavelength of a light source. First, a wavelength-tunable multi-wavelength light source is used as a detection light source to provide corresponding functions of coarse-grained wavelength division and fine-grained wavelength scanning. Second, this application proposes an optical sending and receiving assembly having a correlation between a wavelength and an emission angle, where sensitivity of a vertical emission angle to a wavelength is relatively weak, and sensitivity of a horizontal emission angle to a wavelength is relatively strong. Therefore, a plurality of wavelength components of the multi-wavelength light source may be used as coarse-grained wavelength division, and may be projected to different vertical emission angles by using the optical sending and receiving assembly, to implement parallel measurement of a plurality of vertical channels. In addition, tuning the multi-wavelength light source to achieve a small-range frequency shift in a spectrum of the multi-wavelength light source may be used as fine-grained wavelength scanning, and a plurality of wavelength components having a small-range frequency shift may be projected to different horizontal emission angles by using the optical sending and receiving assembly, to implement horizontal scanning.

Embodiment 2

A difference between this embodiment and Embodiment 1 lies in that, an MEMS is used to replace the horizontal scanning assembly in the sending and receiving assembly in Embodiment 1, a wavelength scanning mechanism is combined with the MEMS (Micro-Electro-Mechanical System, micro-electro-mechanical system), and solid scanning of detection space is implemented through one-dimensional wavelength scanning and one-dimensional MEMS scanning.

Figures 8, 9:
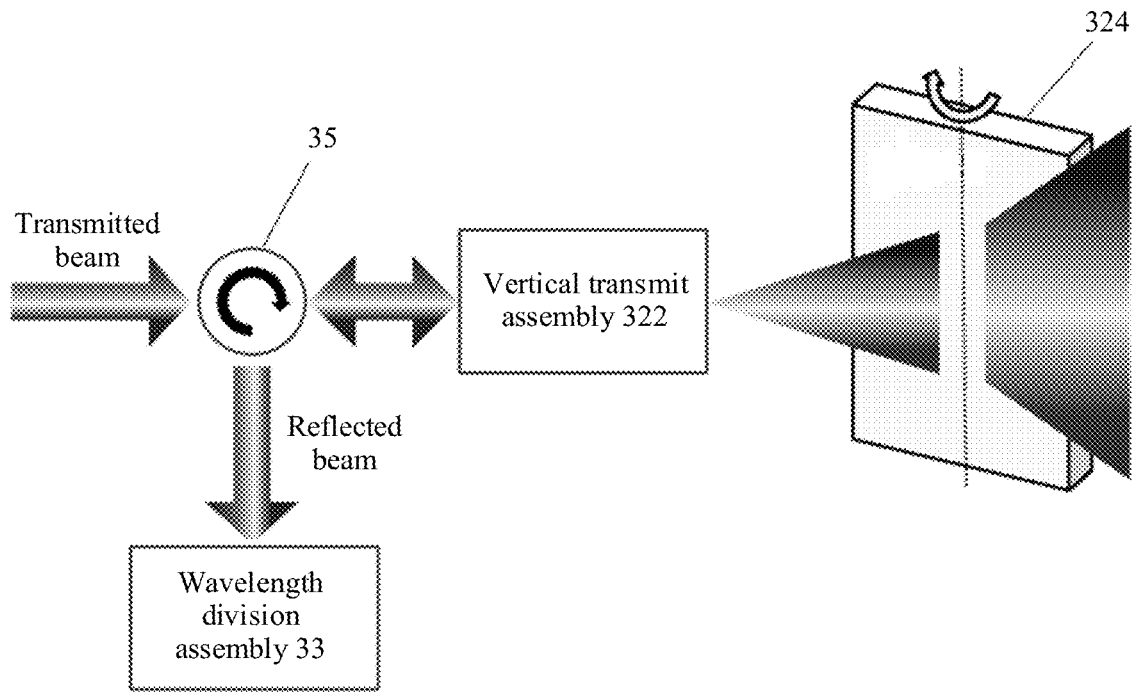
FIG. 8 is a schematic diagram of a structure of a sending and receiving assembly according to Embodiment 2 of this application.
FIG. 9 shows wavelength distribution when a detection apparatus performs detection and scanning according to Embodiment 2 of this application.
Figure 10:
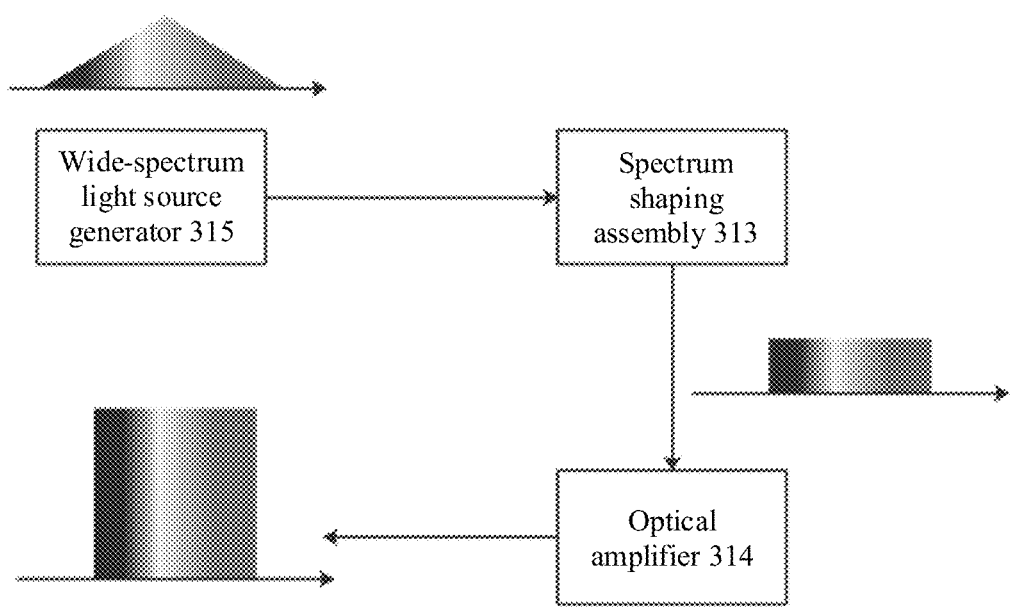
FIG. 10 is a schematic diagram of a structure of a laser generation assembly according to Embodiment 2 of this application.

As shown in FIG. 8, a sending and receiving assembly in Embodiment 2 includes a vertical transmit assembly 322 and a micro-electro-mechanical system 324 deployed on a transmission path of a beam transmitted by the vertical transmit assembly 322, and a mirror of the micro-electro-mechanical system 324 implements rapid scanning in a horizontal direction.

FIG. 9 shows wavelength distribution when a detection apparatus performs detection and scanning according to Embodiment 2 of this application. As shown in FIG. 8, a laser generation assembly only needs to generate N beams of different wavelengths. Because horizontal scanning is implemented by using the MEMS, the laser generation assembly does not need to be adjusted to achieve a small-range overall frequency shift of different wavelengths in a spectrum. This overcomes disadvantages of high difficulty in designing the horizontal transmit assembly in Embodiment 1 and high difficulty in controlling two-dimensional MEMS scanning in conventional laser radar, simplifies a system, and reduces system costs and complexity.

Because the laser generation assembly does not need to achieve a small-range overall frequency shift of different wavelengths in a spectrum, the laser generation assembly may be simplified, a structure may be further simplified, and structural complexity and costs of the detection apparatus may be reduced.

As shown in FIG. 9, the laser generation assembly includes a wide-spectrum light source generator 315, and a spectrum shaping assembly 313 and an optical amplifier 314 that are sequentially disposed on a transmission path of a laser beam emitted by the wide-spectrum light source generator 315.

The wide-spectrum light source generator 315 generates wideband laser light that directly enters the spectrum shaping assembly 313 for spectrum shaping, to filter out redundant wavelength components and flatten power of wavelength components. Then, the wideband laser light is amplified by the optical amplifier 314 to improve a detection signal-to-noise ratio and a measurement distance, and is sent to the sending and receiving assembly to complete work such as scanning and ranging.

In Embodiment 2, the laser generation assembly does not require characteristics such as a small-range overall frequency shift of different wavelengths in a spectrum, a spacing between adjacent wavelengths, and wavelength tunability, but only needs to have a multi-wavelength characteristic. Therefore, the wide-spectrum light source generator that can generate a continuous light spectrum is selected as a light source, for example, an optical device such as a super-continuum light source generator or an ASE light source generator that can implement wide-spectrum output may be used. The optical resonant cavity in Embodiment 1 is not required, thereby further simplifying the apparatus.

This application further provides a laser radar system including one or more detection apparatuses described above, to obtain motion parameters of detection targets in a plurality of detection areas based on electrical signals detected by the detection apparatus.

This application further provides a terminal including the foregoing detection apparatus or laser radar system. The motor vehicle terminal is a terminal that uses the laser radar system, such as a motor vehicle or a surveying and mapping terminal.

The motor vehicle is used as an example to describe use of the detection apparatus or the laser radar system on the motor vehicle. The laser radar system is mounted on the motor vehicle, and the laser radar system is communicatively connected to an automated driving system on the motor vehicle. Detection apparatuses are mounted at a plurality of positions on the motor vehicle (detection points are preferably deployed to cover a panoramic view around the motor vehicle, and certainly, detection points may alternatively be deployed based on an actual requirement). A detection apparatus at each detection point completes space scanning to obtain spatial point cloud data of each detection point. The automated driving system of the motor vehicle combines spatial point cloud data of all detection points to form spatial point cloud information of an ambient environment of the vehicle, to sense ambient environment information.

In the descriptions of this specification, the specific features, structures, materials, or characteristics may be combined in a proper manner in any one or more of embodiments or examples.

Finally, it should be noted that the foregoing embodiments are merely intended for describing the technical solutions of this application, but for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A detection apparatus, comprising:
a laser generation assembly, configured to generate a detection beam, wherein the detection beam comprises N emitted sub-beams, the laser generation assembly comprises a single-frequency laser and an optical resonant cavity, the single-frequency laser is configured to emit single-frequency laser light, and the optical resonant cavity is disposed on a transmission path of the single-frequency laser light, and is configured to act on the single-frequency laser light to generate M sub-beams, wherein wavelengths of the M sub-beams are different from each other, and M is a positive integer greater than or equal to N;
a sending and receiving assembly, configured to transmit the N emitted sub-beams to target scanning space at different emission angles, and converge N reflected sub-beams into a reflected beam, wherein wavelengths of the N emitted sub-beams are different from each other, the emission angles correspond to the wavelengths of the emitted sub-beams, the N reflected sub-beams are beams formed through reflection after the N emitted sub-beams detect at least one detection object, and N is a positive integer greater than 1;
a wavelength division assembly, configured to obtain, based on the reflected beam, the N reflected sub-beams corresponding to different wavelengths; and
a detector array, configured to output corresponding electrical signals based on the N reflected sub-beams from the wavelength division assembly, wherein
the detector array comprises N detectors, and the N detectors correspond to the N reflected sub-beams.

2. The detection apparatus according to claim 1, wherein the wavelength division assembly comprises a wavelength division multiplexer, the wavelength division multiplexer comprises N wavelength channels, the N wavelength channels respectively correspond to the wavelengths of the N reflected sub-beams, and the N detectors respectively correspond to output ends of the N wavelength channels.

3. The detection apparatus according to claim 2, wherein the wavelength division assembly further comprises N filter elements, pass-through wavelengths of the N filter elements correspond to the wavelengths of the N reflected sub-beams, and the N filter elements are respectively disposed between the output ends of the N wavelength channels and the N detectors.

4. The detection apparatus according to claim 1, further comprising an optical circulator, wherein the optical circulator comprises at least a first port, a second port, and a third port, an optical channel is formed from the first port to the second port, and an optical channel is formed from the second port to the third port; and
the first port is connected to the laser generation assembly, the second port is connected to the sending and receiving assembly, and the third port is connected to the wavelength division assembly.

5. The detection apparatus according to claim 1, wherein the laser generation assembly further comprises a spectrum shaping assembly; and
the spectrum shaping assembly is configured to obtain N sub-beams from the M sub-beams, wherein wavelengths of any two of the N sub-beams are different, and a power difference between any two of the N sub-beams is less than or equal to a preset threshold.

6. The detection apparatus according to claim 5, wherein the laser generation assembly further comprises an optical amplifier; and the optical amplifier is configured to increase power of each of the N sub-beams by a preset multiple to form the N emitted sub-beams.

7. The detection apparatus according to claim 1, wherein spacings between adjacent wavelengths of the N emitted sub-beams are equal; and
the sending and receiving assembly comprises a vertical transmit assembly, configured to transmit the emitted sub-beams of different wavelengths to the target scanning space at different pitch angles.

8. The detection apparatus according to claim 7, wherein the laser generation assembly is further configured to adjust at least one of: a quantity of N emitted sub-beams in the detection beam or the spacings between adjacent wavelengths of the N emitted sub-beams.

9. The detection apparatus according to claim 7, wherein the vertical transmit assembly comprises a collimator and a convex lens; and
the collimator is disposed on a focal plane of the convex lens and deviates from a focal point of the convex lens, and is configured to collimate the detection beam and make the detection beam incident onto the convex lens.

10. The detection apparatus according to claim 7, wherein the vertical transmit assembly comprises a collimator and a diffraction grating; and
the collimator is configured to collimate the detection beam and make the detection beam incident onto the diffraction grating.

11. The detection apparatus according to claim 7, wherein the laser generation assembly is further configured to sequentially adjust the wavelengths of the N emitted sub-beams as a whole in a preset wavelength range;
the sending and receiving assembly further comprises a horizontal transmit assembly; and
the horizontal transmit assembly is disposed on a transmission path of a beam transmitted by the vertical transmit assembly, and is configured to transmit the emitted sub-beams of different wavelengths to the target scanning space at different azimuths based on different wavelengths.

12. The detection apparatus according to claim 11, wherein the horizontal transmit assembly comprises at least one optical dispersion element, which is disposed on the transmission path of the beam transmitted by the vertical transmit assembly and transmits the emitted sub-beams of different wavelengths to the target scanning space at different azimuths.

13. The detection apparatus according to claim 12, wherein the horizontal transmit assembly further comprises at least one convex reflector, and the at least one convex reflector is disposed on a transmission path of a reflected beam of the optical dispersion element.

14. The detection apparatus according to claim 11, wherein the spacings between adjacent wavelengths are greater than the preset wavelength range.

15. A laser radar system, comprising a detection apparatus, wherein the detection apparatus comprises:
a laser generation assembly, configured to generate a detection beam, wherein the detection beam comprises N emitted sub-beams, wherein the laser generation assembly comprises a single-frequency laser and an optical resonant cavity, the single-frequency laser is configured to emit single-frequency laser light, and the optical resonant cavity is disposed on a transmission path of the single-frequency laser light, and is configured to act on the single-frequency laser light to generate M sub-beams, wherein wavelengths of the M sub-beams are different from each other, and M is a positive integer greater than or equal to N;

a sending and receiving assembly, configured to transmit the N emitted sub-beams to target scanning space at different emission angles, and converge N reflected sub-beams into a reflected beam, wherein wavelengths of the N emitted sub-beams are different from each other, the emission angles correspond to the wavelengths of the emitted sub-beams, the N reflected sub-beams are beams formed through reflection after the N emitted sub-beams detect at least one detection object, and N is a positive integer greater than 1;

a wavelength division assembly, configured to obtain, based on the reflected beam, the N reflected sub-beams corresponding to different wavelengths; and a detector array, configured to output corresponding electrical signals based on the N reflected sub-beams from the wavelength division assembly, wherein the detector array comprises N detectors, and the N detectors correspond to the N reflected sub-beams.

16. The laser radar system according to claim 15, wherein the wavelength division assembly comprises a wavelength division multiplexer, the wavelength division multiplexer comprises N wavelength channels, the N wavelength channels respectively correspond to the wavelengths of the N reflected sub-beams, and the N detectors respectively correspond to output ends of the N wavelength channels.

17. The laser radar system according to claim 16, wherein the wavelength division assembly further comprises N filter elements, pass-through wavelengths of the N filter elements correspond to the wavelengths of the N reflected sub-beams, and the N filter elements are respectively disposed between the output ends of the N wavelength channels and the N detectors.

* * * * *